United States Patent [19]

Saund et al.

[11] Patent Number: 5,760,925
[45] Date of Patent: Jun. 2, 1998

[54] PLATENLESS BOOK SCANNING SYSTEM WITH A GENERAL IMAGING GEOMETRY

[75] Inventors: Eric Saund, San Carlos; Andrew A. Berlin, Palo Alto, both of Calif.

[73] Assignee: Xerox Corporation, Stamford, Conn.

[21] Appl. No.: 657,711

[22] Filed: May 30, 1996

[51] Int. Cl.$^6$ ............................. H04N 1/04; G03B 27/32
[52] U.S. Cl. ..................... 358/497; 358/474; 399/362; 355/25; 355/82
[58] Field of Search ..................... 358/497, 406, 358/447, 449, 474, 463, 493; 355/25, 82, 55; 399/361, 362; 250/206.1, 206.2, 556, 557, 208.1; 382/293

[56] References Cited

U.S. PATENT DOCUMENTS

| | | | |
|---|---|---|---|
| 4,910,601 | 3/1990 | Gerlach | 358/474 |
| 4,965,499 | 10/1990 | Taft et al. | 318/568.11 |
| 4,980,720 | 12/1990 | Siegel | 355/233 |
| 5,084,611 | 1/1992 | Okisu et al. | 250/208.1 |
| 5,119,206 | 6/1992 | Rourke et al. | 358/296 |
| 5,194,729 | 3/1993 | Okisu et al. | 250/222.1 |
| 5,212,568 | 5/1993 | Graves et al. | 358/474 |
| 5,243,665 | 9/1993 | Maney et al. | 382/8 |
| 5,276,530 | 1/1994 | Siegel | 358/406 |
| 5,359,207 | 10/1994 | Turner | 257/81 |
| 5,377,019 | 12/1994 | Okisu et al. | 358/464 |
| 5,416,609 | 5/1995 | Matsuda et al. | 358/474 |
| 5,511,148 | 4/1996 | Wellner | 395/106 |
| 5,585,926 | 12/1996 | Fujii et al. | 358/471 |

FOREIGN PATENT DOCUMENTS

3546404A1 of 1993 Germany ............. G02B 27/02

OTHER PUBLICATIONS

U.S. Patent Application No. 08/570,880 entitled "Bound Document Imager with Page Turner" to Turner et al., filed on Dec. 12, 1995.

U.S. Patent Application No. 08/570,791 entitled "Bound Document Imager with Air Jet Page Turning System" to Turner et al., filed on Dec. 12, 1995.

Wong, H., Kang, W., Giordano, F.P. and Yao, Y.L., "Performance Evaluation of a High-Quality TDI-CCD Color Scanner," SPIE vol. 1656 High-Resolution Sensors and Hybrid Systems (1992), pp. 183-194.

Strat, T.M., "Recovering the Camera Parameters from a Transformation Matrix," Readings in Computer Vision: Issues, Problems, Principles, and Paradigms, Morgan Kaufman Publishers, Inc., Los Altos, CA., pp.93-100.

TZ-3BWC Combination grayscale/24-bit color scanner, Truvel Corporation Data Sheet, two pages. (Data Sheet printed in Apr. 1989).

Ballard, D.H., Brown, C.M., "Imaging Devices for Computer Vision," Computer Vision, Published by Prentice-Hall, Inc., Englewood Cliffs, NJ, pp. 52-56.

Primary Examiner—Edward L. Coles, Sr.
Assistant Examiner—Madeleine AV Nguyen
Attorney, Agent, or Firm—Thomas B. Zell

[57] ABSTRACT

An overhead scanning system records pages from bound documents in an upright and open condition. The scanning system is defined with a general imaging geometry that makes the scanning system readily portable, and provides the scanning system with a variable imaging area. Once an operator defines an imaging area of an image acquisition system, the operator positions a light stripe projector to project across the imaging area. After recording calibration data, a perspective transform is provided by a perspective transform generator. In operation, a first image of the bound document having a light stripe projected there across is recorded by the image acquisition system. A page shape transform generator is then used to derive a page shape transform. Subsequently, a second image of the bound document is recorded without projecting a light stripe thereacross. If the second image is warped because of foreshortening, or magnification due to the pages of the bound document being curved, an image correction system de-warps the second image using the perspective and page shape transforms. The de-warped image is reconstructed by "polling" each location in the second image to determine the value of each pixel in the de-warped image.

22 Claims, 13 Drawing Sheets

PLATENLESS BOOK SCANNING SYSTEM WITH A GENERAL IMAGING GEOMETRY

The present invention relates generally to a system for scanning bound documents, and more particularly to a platenless scanner having a general imaging geometry for recording bound documents in an open and face-up condition.

BACKGROUND OF THE INVENTION

Book scanners are becoming more prevalent given the advent of inexpensive digital storage and the ease with which digital information can be disseminated and reproduced. Recording bound documents in a digital format has become an important manner in which to preserve information in ancient books, periodicals, manuscripts, or any other document having a bound edge with a hard or soft cover. Institutions such as the Library of Congress, the Vatican library, and university libraries seek to scan large numbers of volumes of books, both to create digital libraries capable of feeding the information superhighway and to halt the rapid decay of information stored in older printed works. Once the content of a page of a bound document is scanned and electronically recorded, the recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted and supplemented with additional information and reproduced on demand as hardcopy using an electronic printing machine or the like.

Different arrangements exist for scanning bound documents. Most arrangements are traditional flat-bed platen scanners that scan bound documents in a face-down position. A disadvantage of flat-bed scanning arrangements is that they require the application of a force to the spine region of a bound document to insure that the bound document comes within a scanner's depth of focus. Besides damaging the spine region of a bound document, the scanning process is tedious and time-consuming because the bound document must be repositioned after scanning each page. In addition, image quality is often poor due to loss of focus, uneven illumination, and distortion caused by curvature of a page in the vicinity of the binding. U.S. Pat. Nos. 4,980,720 and 5,276,530 to Siegel disclose an improved arrangement that minimizes the application of force to the spine region of a bound document and improves the image quality of scanned images. Specifically, Siegel discloses a flat-bed scanner with a book mode that minimizes the force typically applied to the spine region of a bound document. In the book scan mode, a page height detector mounted on a scan carriage accounts for the deviation of a book page from the horizontal platen plane in the vicinity of a book's binding. In addition, electronic correction of the captured image is used to compensate for loss of focus, image compression, and uneven illumination. Besides electronic correction, the quality of captured images is maximized by modifying mechanical parameters such as scan rate, and local light source intensity.

Other face-down scanning arrangements minimize the stress on the spine region of bound documents by forming a wedge or an angled platen. Examples of wedge platens for scanning bound documents include, U.S. Pat. No. 5,359,207 to Turner and German Patent DE-A1 3546404. Turner discloses a book scanner with contact imaging that employs two-dimensional sensor arrays that are attached at a common edge and disposed in a wedge shaped manner. German Patent DE-A1 3546404 discloses a roof-shaped book support apparatus for use in a copier application. The optics of the roof-shaped copier arrangement provide that opposing pages of a bound book are simultaneously imaged in the same image plane.

In alternate arrangements, platenless scanners capture image data with a document in a face-up position. Such arrangements do not require additional stress to be applied the binding region of a document when scanned since the document is scanned in its natural open condition. For example, platenless scanners that record a bound document opened face-up from above are disclosed in U.S. Pat. Nos.: 5,084,611; 5,377,019; and 5,416,609. Specifically, U.S. Pat. No. 5,084,611 discloses a document reading apparatus which is disposed above a document table. Curves of the bound document are detected using a curvature detector which includes a linear light source. In addition, the linear light source defines a brightness distribution which is used to rectify image signals received from the document reading means. U.S. Pat. No. 5,377,019 discloses a reading apparatus which can determine an effective image pickup area containing objects such as an operator's hand. U.S. Pat. No. 5,416,609 discloses an image pickup apparatus with a focus adjusting means for controlling an imaging optical system so that an image is in focus on a line sensor during scanning.

In order to facilitate the copying or reproduction of bound documents a plurality of automatic page turning apparatuses have been developed. Such page turning apparatuses minimize the amount of manual effort required to electronically capture the contents of a bound document, as disclosed for example in U.S. patent application Ser. No. 08/570,880 entitled "Bound Document Imager with Page Turner" to Turner et al., filed on Dec. 12, 1995 and assigned to the same assignee as the present invention, and U.S. patent application Ser. No. 08/570,791 entitled "Bound Document Imager with Air Jet Page Turning System" to Turner et al., filed on Dec. 12, 1995 and assigned to the same assignee as the present invention. Further advances have been made to electronic publishing systems to offer job programming of books on a flat bed scanning system. For example, U.S. Pat. No. 5,119,206 to Rourke et al. discloses a system that can be programmed to scan either a selected side or both sides of the bound document. Also, U.S. Pat. No. 5,212,568 to Graves et al. discloses an electronic reprographic apparatus for selectively controlling the areas of the document to be imaged.

In general, book scanners with a restricted geometry operate under the assumption that the spine of a bound document is parallel to the fast scan direction of a scanning system having a scan bar. By making this assumption, the page shape of a bound document placed open on a flat surface can be approximated using a cylindrical model. The cylindrical model assumes that the shape of a page can be approximated using a planar curve oriented perpendicular to the spine of a bound document, where the planar curve is constant for all cross sections taken at different locations along the spine of the bound document. By assuming that a scanner has a restricted geometry and operates under the cylindrical model, perspective imaging terms that are not ordinarily separable with a book scanner having a general imaging geometry decompose into separate components. In contrast, a scanner with a general imaging geometry does not make any assumptions regarding the orientation of the bound document relative to the image plane of a scanner and therefore cannot simplify perspective image correction into a set of image terms that can be independently corrected.

Under both general imaging geometry and restricted imaging geometry, the configuration of the image sensor with respect to the document is a source of image distortion. The distortion effects are especially severe for non-planar documents such as the pages of bound documents. Under the special assumptions of a cylindrical page shape model and restricted imaging geometry, this distortion decomposes into two components that can be independently corrected using optical/mechanical and/or image processing techniques. "Magnification" is one source of distortion that occurs parallel to the axis of the spine of a book, which is along the fast-scan direction of an image sensor in the case of a system having a restricted imaging geometry. This source of distortion arises from the variation in distance from the image sensor to a page at different positions along the slow-scan direction across the page (i.e. vertical slices of the page farther from the sensor project to a smaller section of the sensor than slices nearer to the sensor). Distortion due to "magnification" can be corrected by adjusting the focal length of a lens, or by performing a magnification and translation adjustment of an image slice electronically. "Spacing" is another source of distortion that arises when equal angle rays from the image sensor to the document along the slow-scan direction project to differently spaced fast-scan slices, due to variations of the orientation of the page with respect to the image sensor at different slow-scan locations across the page. This distortion is typically most severe near the spine of a book where the open page slopes severely away from the sensor. Spacing distortion can be corrected by controlling the slow-scan sampling of fast-scan image slices by a scan bar as its projection sweeps across the page, or it can be corrected electronically on a slow-scan-line by slow-scan-line basis after magnification correction is performed.

An assumption that a scanner has a restricted geometry is advantageous because distortions of each scan line of an image can be independently corrected, however, the assumption has the disadvantage that not all image distortions decompose into separable components. For example, distortions occurring when a book is skewed away from the fast scan direction cannot be corrected by a scanning system with a restricted geometry. In other words, errors that occur because the spine of a bound document is not exactly aligned with the fast scan direction of a scan bar, cannot be corrected by a scanner with a restricted geometry. In addition, the aforementioned systems for scanning bound documents have defined and non-varying imaging areas. The imaging area of such scanning systems is fixed for a predefined geometry. Generally, the imaging areas of each of the aforementioned systems is defined by the physical scanning apparatus. For example, the platenless overhead scanners disclosed above would not operate if the document reading apparatus were repositioned relative to the imaging area on document reading table.

Accordingly, it would be desirable to provide a system for scanning bound documents that have a variable imaging area. Such a scanning system would have the advantage of being portable since the document reading table would not have to be fixed to the document reading apparatus. It would also be desirable to have a scanning system with a general imaging geometry that is capable of correcting image distortion occurring when the spine of a bound document is not aligned with the fast scan direction of a scan bar.

SUMMARY OF THE INVENTION

In accordance with one aspect of the invention, there is provided a scanning system for scanning pages of a bound document. The scanning system includes a support for the bound document. The pages of the bound document which have a non-planar contour defined in a three-dimensional first coordinate system are positioned in an open and upward facing condition. A light stripe projector illuminates the bound document positioned on the support with a light stripe to form a geometrical profile map of the bound document in three dimensions. An image acquisition system records image data and page shape data in a focal plane defined in a two-dimensional second coordinate system, wherein the recorded page shape data represents the bound document with the illuminated light stripe and the recorded image data represents the bound document without the illuminated light stripe. A first transform generator evaluates the page shape data to define a relationship between the first coordinate system and a two-dimensional third coordinate system. The two-dimensional third coordinate system defines an output space in which an output page of the bound document is represented in two dimensions. A second transform generator calibrates the image acquisition system with respect to the first coordinate system. The second transform generator provides a second transform to transform the recorded image data from the first coordinate system to the second coordinate system. An image correction system de-warps the recorded image data to form corrected image by performing a first mapping, with the first transform, between the third coordinate system and the first coordinate system, and by performing a second mapping, with the second transform, between the first coordinate system and the second coordinate system to define a location in the second coordinate system that corresponds to a location in the third coordinate system.

In accordance with another aspect of the invention, there is provided a method for scanning pages of a bound document having a non-planar contour when open and in an upward facing condition. The method includes the steps of: providing a support for maintaining the bound document in an open condition in a three-dimensional first coordinate system; illuminating the bound document positioned on the support with a light stripe to form a geometrical profile map of the bound document in three dimensions; recording image data and page shape data upon a focal plane defining a two-dimensional second coordinate system of an image acquisition system, wherein the recorded page shape data represents the bound document with the illuminated light stripe and the recorded image data represents the bound document without the illuminated light stripe; evaluating the page shape data to define a relationship between the first coordinate system and a two-dimensional third coordinate system defining an output space in which a output page of the bound document is represented in two dimensions, the evaluating step providing a first transform to transform the recorded image data from the third coordinate system to the first coordinate system; calibrating the image acquisition system with the first coordinate system, the calibrating step providing a second transform to transform the recorded image data from the first coordinate system to the second coordinate system; and de-warping the recorded image data to form corrected image data. The de-warping step includes the steps of: performing a first mapping, with the first transform, between a location in the third coordinate system and a location in the first coordinate system, performing a second mapping, with the second transform, between the location in the first coordinate system and a location in location in the second coordinate identifying the location in the second coordinate system that corresponds to the location in the third coordinate system with the first mapping and the second mapping.

In accordance with yet another aspect of the invention, there is provided a scanning system for scanning a bound document that includes an image acquisition system for recording calibration data, image data, and page shape data. An image processing system in the scanning system provides corrected image data using the recorded calibration data and the recorded page shape data to de-warp the recorded image data so that distortions of the bound document in the recorded image data are minimized in the corrected image data.

BRIEF DESCRIPTION OF THE DRAWINGS

These and other aspects of the invention will become apparent from the following description which illustrates preferred and alternative embodiments of the invention read in conjunction with the accompanying drawings wherein the same reference numerals have been applied to like parts and in which.

DETAILED DESCRIPTION

Figure 1:
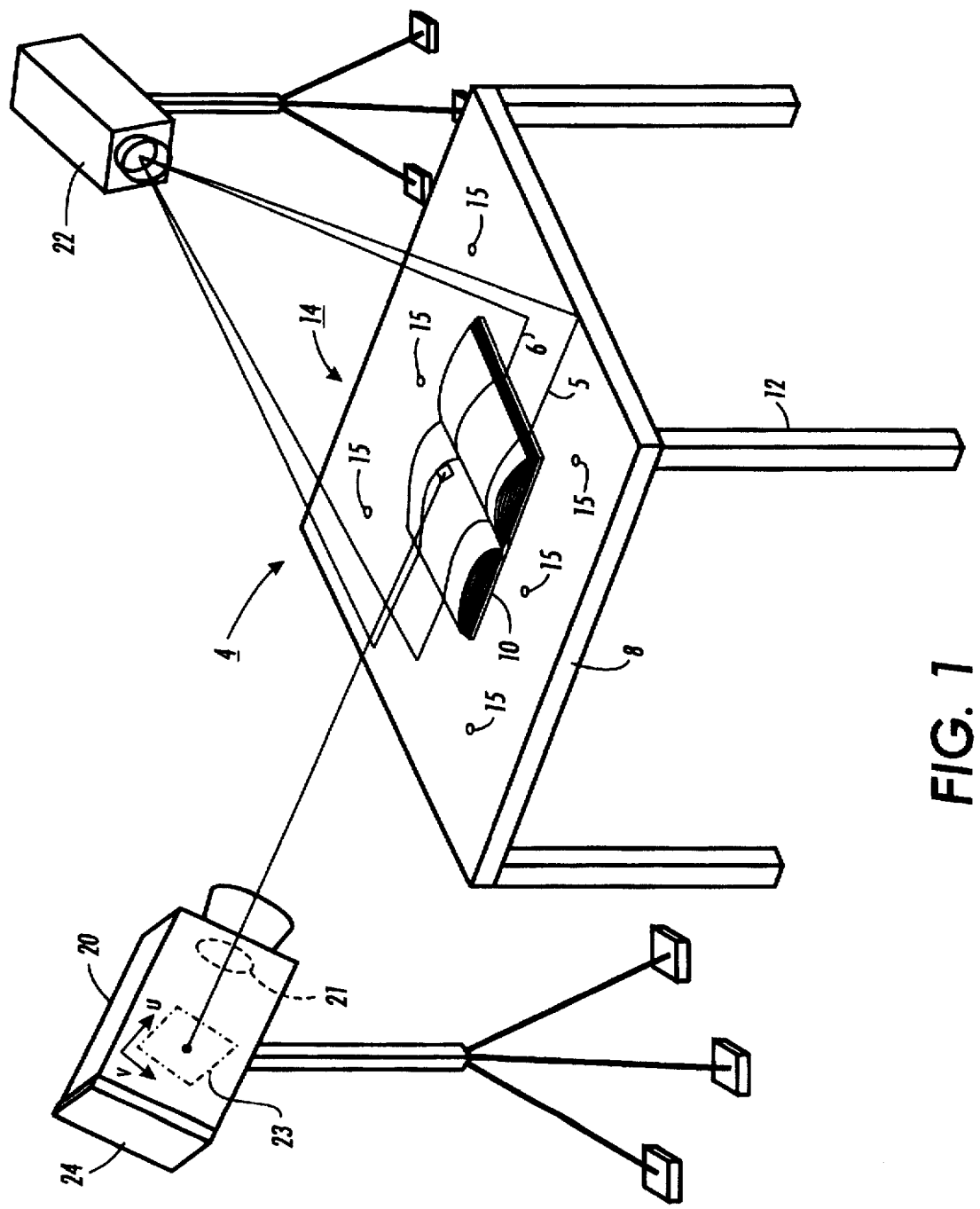
FIG. 1 is an illustration of a system for scanning bound documents incorporating the present invention.

Referring now to the drawings where the showings are for the purpose of describing the preferred embodiment of the invention and not for limiting same, FIG. 1 shows a bound document scanning system 4 incorporating the present invention. Generally, the bound document scanning system 4 includes a platform 8 for supporting a bound document 10 in an open condition. The platform 8 is supported by legs 12. By providing removable or foldable less 12, the platform 8 is portable and can be readily transported from one location to another. Built into platform 8 is a calibration system which includes marks 15, the calibration system being generally designated by reference numeral 14. In addition to the platform 8 and the calibration system 14, bound document scanning system 4 includes an image acquisition system 20, a light stripe projection system 22, an electronic subsystem system 24 (ESS). Each of the elements of the scanning system 4 are not positioned in an assigned location relative to each other. When the scanning system 4 is positioned in a new location, the calibration system 14 is used to orient the image acquisition system 20 relative to the platform 8.

Image acquisition system 20 in a preferred embodiment is a high resolution digital color camera having internal optics, shown generally by reference numeral 21, that focus an image on internal focal plane 23. The high resolution camera contains an array of active photosensors that convert optical image data into electrical signals. Photosensor arrays are well known in the art and include two-dimensional flat panel detectors and one-dimensional and two-dimensional charge coupled devices (CCDs). An example of a flat panel detector is disclosed in U.S. Pat. No. 5,017,989, and an example of a scanning carriage system using a one-dimensional CCD array is disclosed in U.S. Pat. No. 5,276,530, the disclosures of which are incorporated herein by reference.

Light stripe projection system 22 is used by the scanning system 4 to measure the surface shape of bound document 10 by projecting across the bound document 10 on platform 8 one or more stripes of light that are identified by numerals 5 and 6 in FIG. 1. The basic principles of light striping are described by Ballard et al. in "Computer Vision", Prentice-Hall, 1982 pp. 52–54. Light striping is a type of structured light in which the illumination of an object in a scene is used to extract geometrical information about the object itself. Here, light striping is used to identify the shape of bound document 10 on platform 8. More specifically, light striping is performed in order to detect the three-dimensional shape of a page and thereby correct distortions cause by image perspective, skew, and compression or elongation introduced by oblique viewing angles of image acquisition system 20. The light-stripe source 22 can contain a laser or an ordinary light bulb that projects an image of a slit. It should be understood, however, by those skilled in the art that there exists a number of different methods which can be used to measure the surface shape of a bound document. In alternate embodiments, the three-dimensional surface of a bound document can be measured using stereo vision, laser rangefinding, sonar rangefinding, projection of a grid, or an alternate mechanical means.

After recording a digital representation of light stripes formed across the bound document 10 using image acquisition system 20, ESS 24 analyzes the digitally recorded image data to identify the shape of the open pages of bound document 10. A microprocessor and control software, which forms ESS 24, coordinate the general operational units of document scanning system 4. ESS 24 which communicates with calibration system 14, image acquisition system 20, and light stripe projection system 22, can either be integral with image acquisition system 20, as shown, or stand alone as part of a computer workstation or the like.

Figure 2:
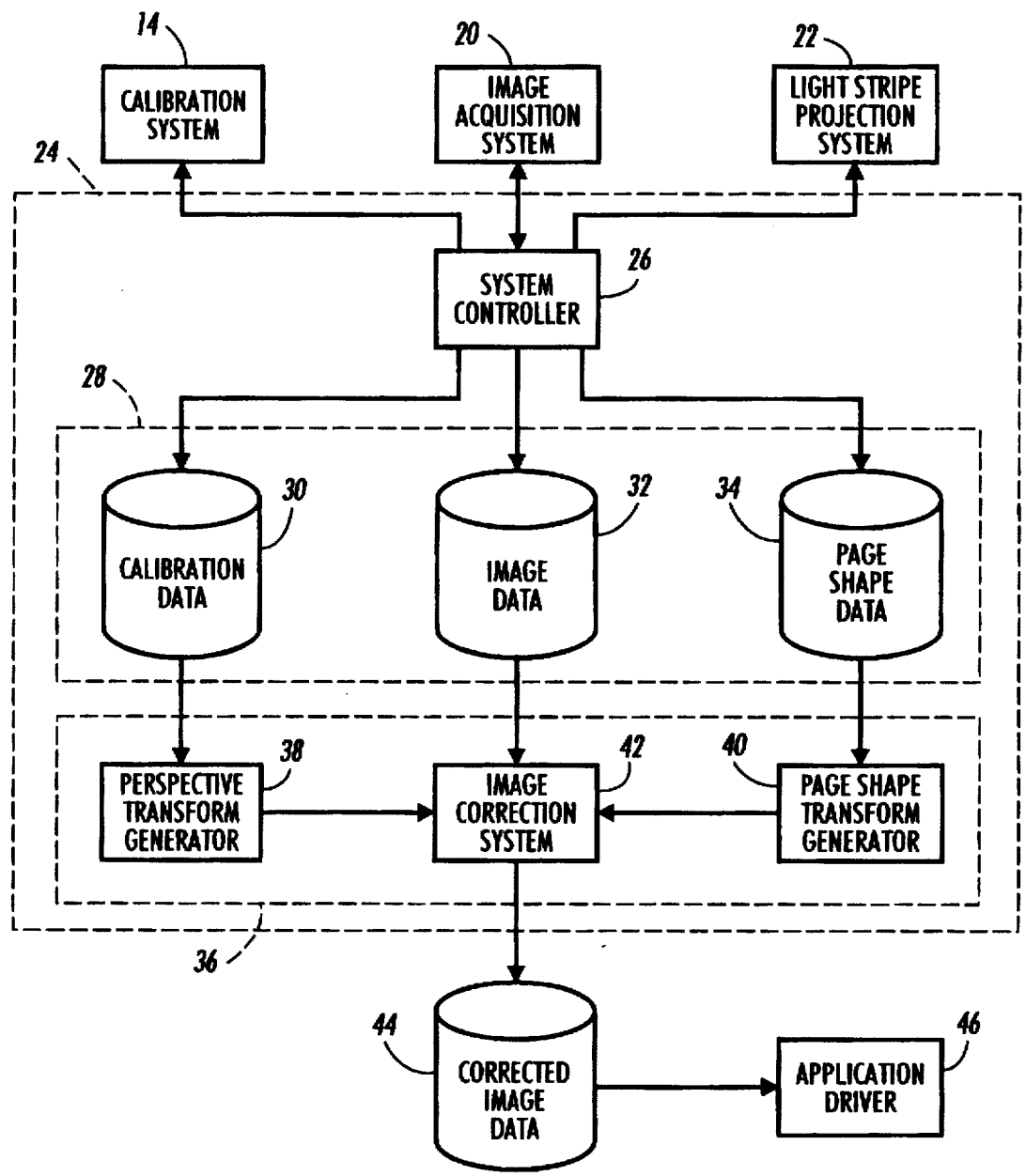
FIG. 2 is a block diagram of the system architecture of the scanning system shown in FIG. 1.
Figure 4:
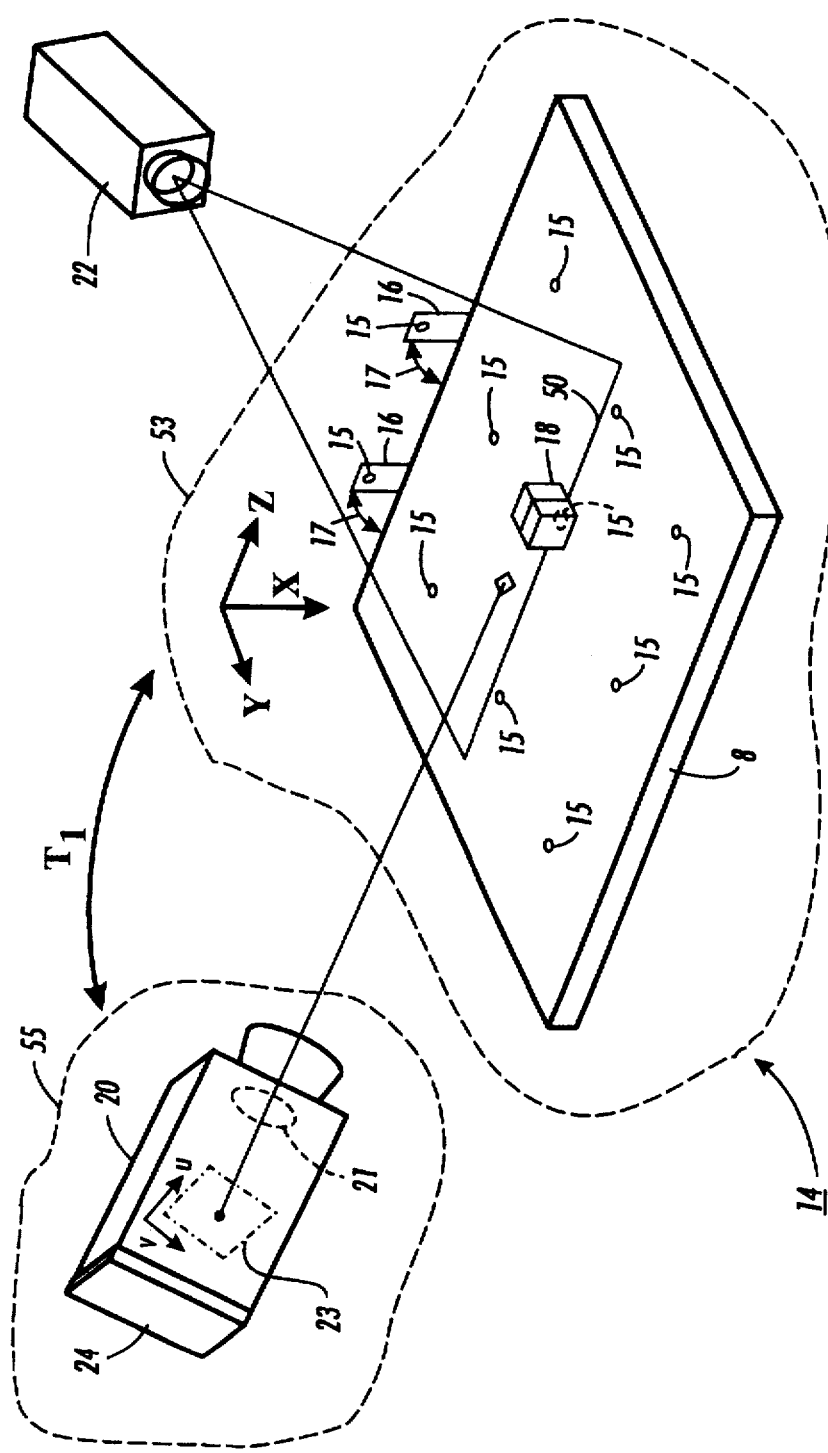
FIG. 4 is an illustration of the calibration system of the scanning system.

FIG. 2 shows a general block diagram of the system architecture of scanning system 4. When operating, scanning system 4 is in one of four states: calibrating, determining page shape information, scanning image data, or de-warping image data. The system controller 26, which forms part of ESS 24, coordinates operations of calibration system 14, image acquisition system 20, and light stripe projection system 22. In operation, depending on the current state of the scanning system 4, system controller 26 selectively invokes calibration system 14 or light stripe projection system 22. When invoking the calibration system 14, either calibration object 18 or movable tabs 16 are put in place (as shown in FIG. 4), and when invoking the light stripe projection system 22, one or more light stripes 5 and 6 are obliquely projected across platform 8. Digital image data received by system controller 26 from image acquisition system 20 is stored on a storage device shown generally by reference numeral 28. The storage device 28 may include RAM, flash memory, floppy disk, or another form of optical or magnetic storage. Depending on whether calibration system 14 and light projection system 22 are invoked, digital image data received by system controller 26 from image acquisition system 20 is stored on storage device 28 either as calibration data 30, image data 32, or page shape data 34.

Once stored on storage device 28, image data is manipulated by image processing system 36 which includes a perspective transform generator 38, a page shape transform generator 40, and an image correction system 42. Perspective transform generator 38 uses image calibration data 30 to provide a perspective transform ($T_1$). The perspective transform ($T_1$) defines an interrelationship between a two-dimensional image coordinate system of the image acquisition system 20 and a world coordinate system in which a page of a bound document is represented in three dimensions. Page shape transform generator 40 uses stored page shape data 34 to provide a page shape transform ($T_2$). The page shape transform ($T_2$) defines an interrelationship between the world coordinate system and a page coordinate system which defines an output space in which a page of bound document 10 is represented in two dimensions. The image correction system 42 generates corrected image data 44 from image data 32 using the perspective transform ($T_1$) and the page shape transform ($T_2$). The corrected image data 44 is either stored on storage device 28 or output directly to a peripheral device through application driver 46. Application driver 46 transmits corrected image data 44 to any peripheral device adapted for displaying, storing, or reproducing as hardcopy corrected image data 44.

Figure 3:
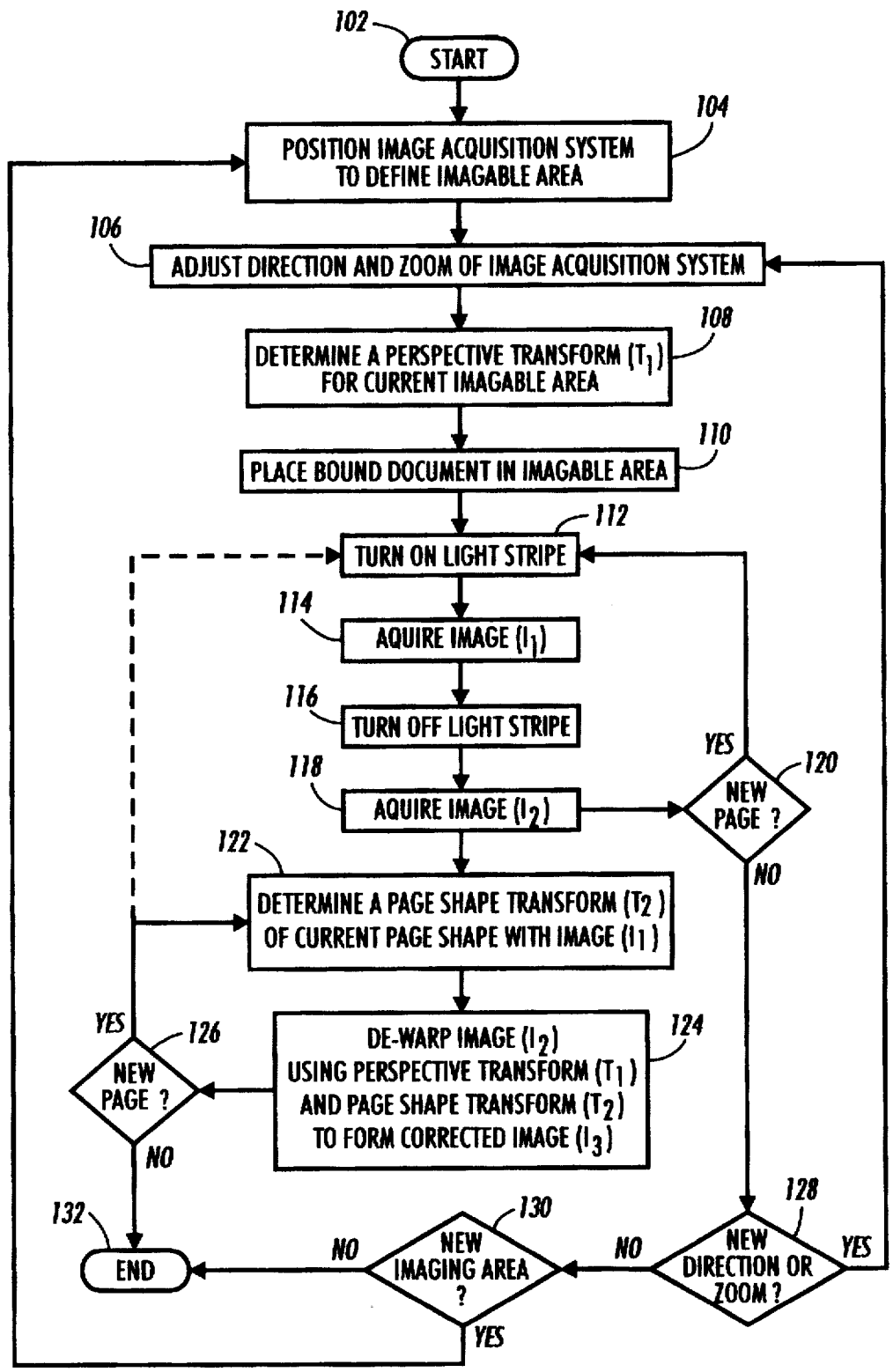
FIG. 3 is a flow diagram showing the general steps for acquiring image data of a bound document using the scanning system incorporating the present invention.

FIG. 3 is a flow diagram showing the general steps for acquiring image data with the bound document scanning system 4. At step 102, the scanning system 4 is set up as shown in FIG. 1. At step 104, a system operator positions the image acquisition system 20 to point at an imaging area, which is defined herein as an area that is recorded on internal focal plane 23 of image acquisition system 20. Subsequently, if necessary the system operator at step 106 adjusts the direction and zoom of image acquisition system 20. At step 108, ESS 24 calibrates the image acquisition system 20 to the imaging area defined at steps 104 and 106 with a perspective transform ($T_1$). After system calibration at step 108, the system operator places bound document 10 on platform 8 in the imaging area at step 110. At step 112, light stripe projection system 22 is turned on. At step 114, an image ($I_1$) of a light stripe projected across bound document 10 is acquired by image acquisition system 20. At step 116, the light stripe projection system 22 is turned off. At step 118, an image ($I_2$) of the bound document 10 is acquired without the projection of a light stripe across it. At step 120, if there is a new page to be scanned, steps 112, 114, 116, and 118 are repeated.

With continued reference to FIG. 3, at step 122 the image processing system 36 determines a page shape transform ($T_2$) of the current page shape using the image ($I_1$) acquired at step 114. At step 124, the image ($I_2$) is de-warped to form a corrected image ($I_3$) using the perspective transform ($T_1$) determined at step 108, and the page shape transform ($T_2$) determined at step 122. Steps 122 and 124 are repeated at step 126 if a subsequent page is acquired at steps 112, 114, 116, and 118. It will be understood by those skilled in the art that the steps 112, 114, 116, and 118 can operate in sequence or in parallel with steps 122 and 124 depending on the performance requirements or the hardware constraints of scanning system 4. At step 128, if the system operator changes the direction or zoom, step 106 is repeated instead of step 112. Alternatively, if a new imaging area is selected by the system operator at step 130, step 104 is repeated. At step 132, if no more pages are to be scanned, system 4 remains in a ready state for scanning subsequent bound documents.

In accordance with the present invention, high-speed scanning of bound documents is enhanced by delaying electronic perspective correction of recorded images. Since a geometrical profile map (i.e. page shape data) and raw image data of an image is recorded at steps 114 and 116 independent from steps 122 and 124, image correction can be delayed or computed in parallel with image acquisition operations. For example, image correction at steps 122 and 124 can be delayed until such time as the bound document is to be viewed or rendered. In addition, when computational correction of raw image data is delayed until the raw image data is read (e.g. displayed on a terminal or reproduced on hardcopy), the overhead of image correction may be hidden from the reader by preparing additional pages of raw image data while a current page is read.

FIG. 4 shows calibration system 14 of the bound document scanning system 4 in detail. In general, two different elements of scanning system 4 require calibration. First, the image acquisition system 20 must be calibrated relative to the platform 8 in order that locations in the three dimensional space of the platform 8 can be identified in an image recorded along the focal plane 23 of image acquisition system 20. Second, the image acquisition system 20 and the platform 8 must be calibrated relative to the light stripe projector 22 in order that the height of an object on the platform 8 can be determined based on the position of a light stripe in an image recorded by the image acquisition system 20. To perform the calibration of two different elements of scanning system 4, the calibration system 14 includes calibration marks 15 on the surface of platform 8, and a calibration object 18. The calibration marks 15 are spaced at a predetermined interval from each other on platform 8 to define a support plane (X,Y). It will be understood, however, by those skilled in the art that the calibration marks 15 can be positioned so as to define a support surface having a non-planar shape such as a wedge. At least two of the calibration marks 15 are positioned outside the X,Y support plane of platform 8 to make calibration calculations more numerically stable. The two calibration marks 15 which are outside the support plane of platform 8 appear on movable tabs 16 that rotate out along side platform 8 when not in use, as indicated generally by arrows 17. The calibration object 18 when not in use is either removed from the surface of platform 8, or alternatively retracted into its surface. Once calibration is complete, a perspective transform ($T_1$) is provided by perspective transform generator 38 (shown in FIG. 2). The perspective transform ($T_1$) defines a transform between a world coordinate system (X,Y,Z), indicated generally by the reference numeral 53, which represents a three dimensional space of bound document 10 on platform 8, and an image coordinate system (u,v), indicated generally by reference numeral 55, which represents image pixels (or image data) in internal focal plane 23 in two dimensions.

Figure 5:
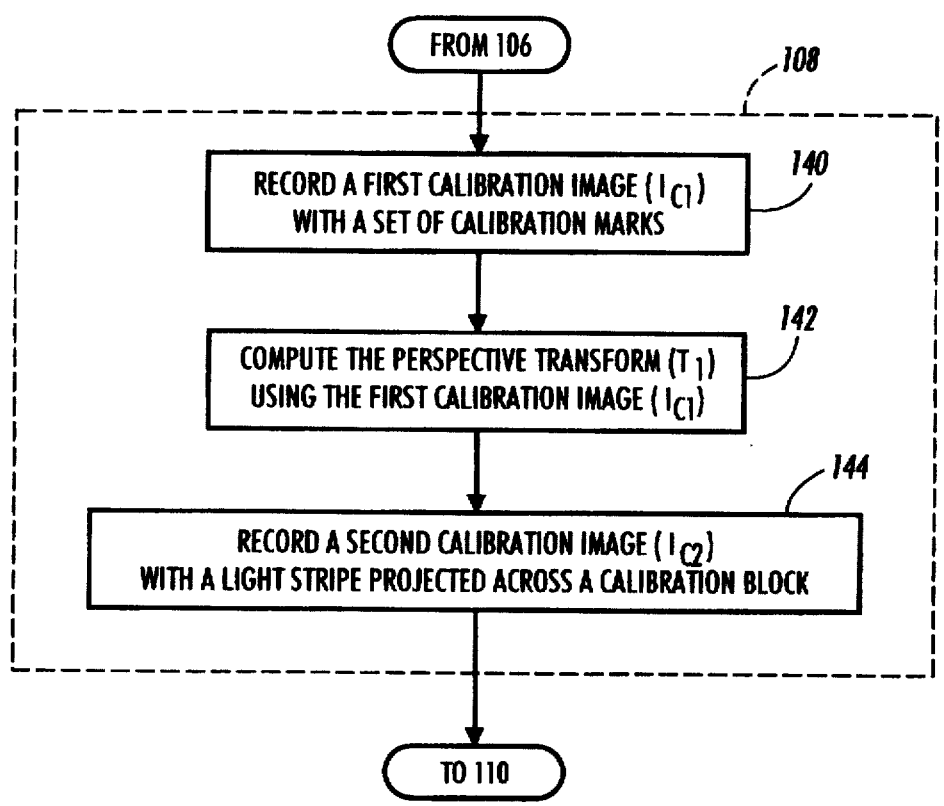
FIG. 5 is a flow diagram showing the general steps for calibrating the scanning system shown in FIG. 1.

FIG. 5 is a flow diagram that details the steps for performing calibration step 108 shown in FIG. 4. Generally at step 108, a perspective transform ($T_1$) is determined which calibrates the current imaging area defined at steps 104 and 106 in the image coordinate frame (u,v) with respect to the world coordinate frame (X,Y,Z). More specifically step 108 includes steps 140, 142, and 144. At step 140, a first calibration image ($I_{c1}$) is recorded which includes calibration marks 15 shown in FIG. 4. Step 140 is performed with the calibration marks 15 visible on movable tabs 16, but without positioning the calibration block 18 on platform 8. During step 140, system controller 26 acquires the first calibration image ($I_{c1}$) from image acquisition system 20 and stores it as calibration data 30 (shown in FIG. 2). At step 142, perspective transform generator 38 computes a perspective transform ($T_1$) with calibration image ($I_{c1}$) using standard calibration techniques. For example, the image acquisition system 20 can be calibrated using the technique disclosed by Strat in "Recovering the Camera Parameters from a Transformation Matrix," published in "Readings in Computer Vision: Issues, Problems, Principles, and Paradigms," Morgan Kaufmann Publishers Inc., 1987, the pertinent portions of which are incorporated herein by reference. Once determined, perspective transform ($T_1$) provides a mapping between any point in the world coordinate system (X,Y,Z) and any point in the image coordinate system (u,v).

At step 144, light stripe 50 is projected at an oblique angle by light stripe projection system 22 across calibration block 18 which is of a known height. During step 144, system controller 26 (shown in FIG. 2) directs the operation of calibration system 14 and light stripe projection system 22. Specifically at step 144, system controller 26 records a second calibration image ($I_{c2}$) with image acquisition system 20 and stores it as calibration data 30. For the purpose of describing the invention, the scanning system 4 is set up such that the projection of the light stripe 50 on the platform 8 falls along a single horizontal line of pixels (u) defining the internal focal plane 23 (u,v) of image acquisition system 20. It will however, be understood by those skilled in the art that this assumption can be relaxed so that a bound document may be positioned so that the projection of light stripe 50 falls along several horizontal lines of pixels defining the internal focal plane 23. In the case of the light stripe falling along a single horizontal line of pixels, the vertical position (v) of this single horizontal line of pixels (along u) in the internal focal plane 23 can be defined as $v_{lso}$, where v is in units of image pixels. In this example, the light stripe 50 is calibrated by placing calibration object 18, which is of a known height $h_{co}$, in the path of the light stripe 50. The image acquisition system 20 then records the position of the projection of the light stripe 50 on the top of calibration object 18. If the height of the calibration object 18 is defined in the internal focal plane 23 as $v_{ish}$, then the height $h_b$ at a point on an arbitrary object, such as a bound document, at which the light stripe 50 projected thereon is viewed at an image scan line $v_b$ is given by:

$$h_b = (v_b - v_{lso}) \frac{h_{co}}{v_{lsh} - v_{lso}} \quad (1)$$

It will be understood by those skilled in the art that the light stripe calibration can be accomplished in many different ways. The purpose of light stripe calibration is to infer the height of each point in a bound document 10 above the surface of platform 8 when it is recorded on the internal focal plane 23 of the image acquisition system 20.

Figure 6:
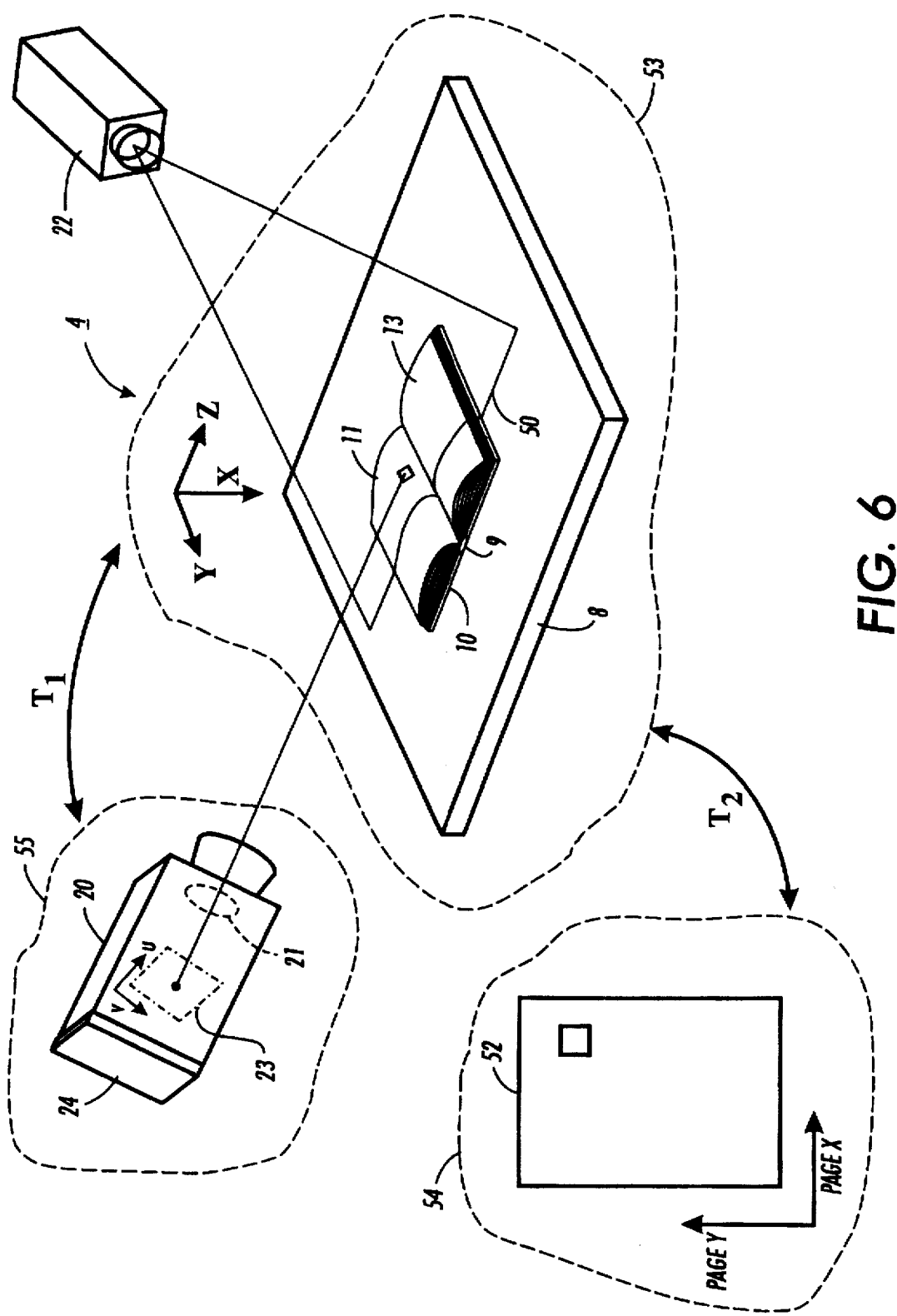
FIG. 6 shows a light stripe projected across a bound document in accordance with the present invention.

FIG. 6 shows a light stripe 50 projected across bound document 10. When recording pages 11 and 13 of bound document 10 two images are recorded by image acquisition system 20. As noted in FIG. 3 at steps 114 and 118, a first image ($I_1$) records bound document 10 with the light stripe projected across it and a second image ($I_2$) records bound document 10 absent the light stripe. The first image ($I_1$) is used by page shape transform generator 40 to determine a page shape transform ($T_2$). The page shape transform ($T_2$) defines a relationship between the world coordinate system 53 (X,Y,Z) and a page coordinate system (page x, page y), indicated generally by the reference numeral 54. The page coordinate system 54 (page x, page y) defines a two-dimensional space which is used to represent a virtual page 52 of the bound document 10 defined in the three-dimensional world coordinate system 53 (X,Y,Z). The virtual page 52 may, for example, represent either an image displayed on a video screen or a hard copy rendering by an electronic printing system. The second image ($I_2$) is used by image correction system 42 to determine a corrected image ($I_3$).

Figure 7:
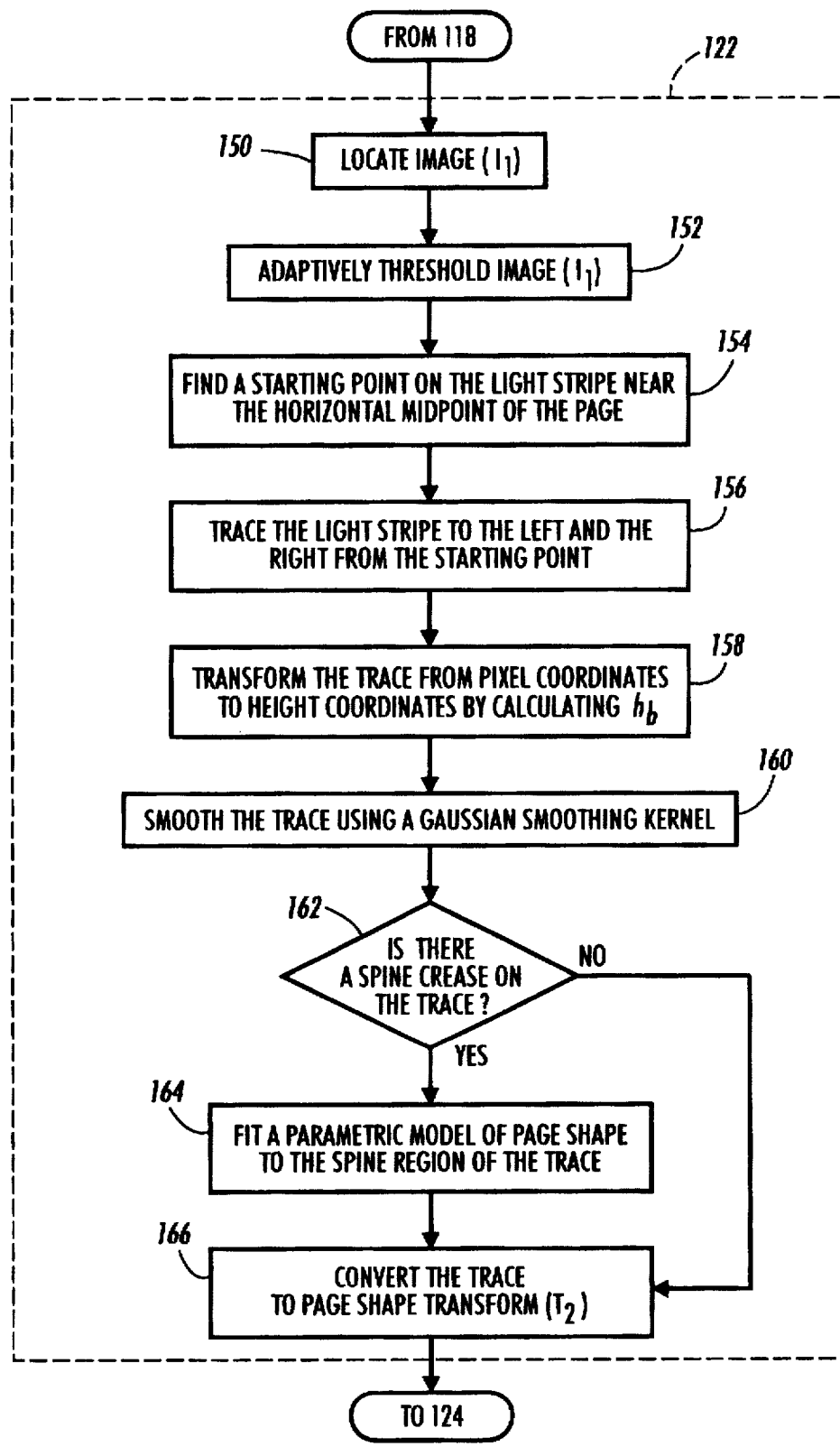
FIG. 7 is a flow chart of the steps for determining a page shape transform ($T_2$) with a first image ($I_1$) which is a recording of a bound document with a light stripe projected across it.

FIG. 7 is a flow chart of the steps for determining a page shape transform ($T_2$) with the first image ($I_1$) determined at step 122 shown in FIG. 3. The page shape transform ($T_2$) provides an estimate of the shape of bound document 10 from light stripe 50. In analyzing the light stripe in the first image ($I_1$) the following factors should be taken into consideration: the light stripe 50 is not the only visible object in the image ($I_1$); the intensity of the light stripe 50 and the intensity of the background of the bound document 10 vary across the image ($I_1$); the light stripe 50 is several pixels wide; the edges of the light stripe 50 are ragged and sometimes broken in the image ($I_1$) due to the light stripe projecting onto printed characters on pages 11 or 13 of document 10; the light stripe 50 becomes very steep in the spine region 9 of bound document 10; and there may exist spurious bright spots in image ($I_1$) not created by the light stripe.

While taking into account the above-noted factors, the following steps are performed to determine the page shape of the bound document 10. For simplicity, the following description assumes that the projection of light stripe 50 on platform 8 is perpendicular to the spine 9 of bound document 10. It will be understood, however, that this method for detecting a light stripe can be performed even if the path of light stripe 50 is not perpendicular to the spine 9 of bound document 10. In general, image ($I_1$) represents a profile of the page shape of the bound document 10. More specifically, the profile given by the light stripe 50 is a cross-section along an axis perpendicular to the spine 9 of the bound document 10. The following steps are performed to identify the light stripe 50 in image ($I_1$) which is then used to define the shape of bound document 10 to correct distortion of the second image ($I_2$). At step 150, an image ($I_1$) recorded by image acquisition system 20 is located by page shape transform generator 40 in memory 28 as stored page shape data 34. In the recorded image ($I_1$) the light stripe 50 is positioned to be generally aligned with the horizontal scan lines of the image ($I_1$). A horizontal scan line is defined herein as a scan line in image ($I_1$) that is perpendicular to a vertical scan line. The following discussion assumes that when the image acquisition system is a one-dimensional CCD array, a vertical scan line represents the fast scan direction and a horizontal scan line represents a slow scan direction. The following discussion further assumes that the spine 9 of bound document 10 is aligned approximately parallel to a vertical scan line, and approximately perpendicular to a horizontal scan line.

At step 152, the image ($I_1$) is adaptively thresholded to identify pixels in the image ($I_1$) that represent light stripe 50 by eliminating non-uniform illumination across bound document 10. The adaptive thresholding step 152 accounts for varying intensities between the light stripe 50 and the background of the bound document 10 recorded across image ($I_1$). Non-uniform illumination across image ($I_1$)

occurs because the imageable area is open to ambient light, and because the reflectance of a page of bound document 10 is unknown. Specifically at step 152, each vertical scan line (v) in image ($I_1$) is sequentially processed by transform generator 40 a scan line at a time. For a current vertical scan line being processed, each pixel in the current vertical scan line is assigned an intensity value of zero except for those pixels having a brightness that is greater by a threshold amount than the brightness of each of the neighboring pixels a fixed distance above and below it on the current scan line, and that have at least as great a brightness as the brightest pixel along the current scan line, minus a tolerance amount. This thresholding step helps improve the contrast between recorded ambient light and recorded light representing the light stripe.

It will be understood by those skilled in the art that other means exist to improve image contrast between recorded ambient light and light recorded from the light stripe projector 22. For example, contrast can be improved by pre-filtering recorded light having the wavelength emitted by the light stripe projector 22. The pre-filtering step would take place before the recorded image ($I_1$) is adaptively thresholded at step 152. Alternatively, known image processing techniques that identify different color intensities can be substituted for the pre-filtering step. This image processing step initially thresholds from the recorded image ($I_1$) any light not having the wavelength projected by the light stripe projector 22, before the image ($I_1$) is adaptively thresholded at step 152. Image contrast can also be increased by emitting infrared (IR) light with the light stripe projector 22. A projected IR light stripe can be recorded with a sensor sensitive to IR light. Alternatively, a projected IR light stripe can be detected using a sensor sensitive to both infra-red light and visible light with an IR filter mounted in front of the sensor.

At step 154, a starting point on the light stripe near a horizontal midpoint of the bound document 10 is located. The horizontal location of the starting point is defined as the horizontal midpoint of the image ($I_1$), plus or minus a fixed horizontal distance of approximately 20 pixels. The vertical location of the starting point, which is determined using an iterative process, is the vertical centroid of non-zero pixels within a window of pixels in the image ($I_1$). The vertical upper and lower dimensions of the window initially extend approximately 20 pixels, toward the vertical midpoint from the top and bottom of the image ($I_1$), respectively. These dimensions, which define a window region, are refined using the iterative process to identify a portion of the light stripe in the image ($I_1$) along the vertical dimension. A first step of this iterative process is to compute the vertical centroid of the non-zero pixels within the window region of the image ($I_1$) adaptively thresholded at step 152. A second step of the iterative process is to redefine the vertical dimensions of the window as the location of the vertical centroid, plus or minus a fixed predetermined distance of approximately 40 pixels. A final step of this iterative process is to compute a new vertical centroid using the new window dimensions. These steps are repeated until the number of non-zero pixels contributing to the centroid is unchanged. This iterative process has the effect of excluding outlier pixels and centering the starting point on the brightest section of the image in the vicinity of the horizontal midpoint of the image ($I_1$), which is assumed to be the light stripe.

At step 156, the light stripe 50 is traced in the image ($I_1$) in each horizontal direction one vertical scan line at a time from the left and the right from the starting point found at step 154. (As defined above, a vertical scan line represents the fast scan direction and a horizontal scan line represents a slow scan direction of the scanning system 4.) Specifically, for each vertical scan line, pixels having a non-zero intensity value are collected within a neighborhood a small vertical distance from a vertical location of the light stripe identified in the previous scan line. The vertical location of the light stripe for a scan line is defined as the centroid or average in all dimensions of the pixels in the neighborhood. If no pixels have a non-zero intensity value in the neighborhood, the vertical distance is increased by an incremental amount and the new neighborhood searched for pixels with a non-zero intensity value. If the neighborhood distance reaches a predetermined maximum value for a current scan line, then the search for a vertical scan line location is abandoned and the vertical scan line location of light stripe from the previous vertical scan line is taken as the current vertical scan line location before processing a subsequent scan line. Upon completing step 156, a trace of the light stripe 50 recorded in image ($I_1$) which represent the contour of the surface of the bound document 10 is determined.

At step 158, the trace determined at step 156 for light stripe 50 in image ($I_1$) is transformed from pixel coordinates to height coordinates by calculating $h_L$ for each pixel as defined by equation (1) set forth above. At step 160, the trace is smoothed using a Gaussian smoothing kernel. Smoothing is performed in order to average out the existence of large dropouts or large transitions between vertical positions that can exist in a trace of the light stripe. For example, the light stripe 50 in image ($I_1$) can be broken at certain vertical positions because the light stripe is projected onto a printed character on a page of document 10. Accordingly at step 156, if one or more pixels is not found to identify the light stripe on a vertical scan line, then the position of the previous scan line is used to define the trace of light stripe in image ($I_1$). As a result, large dropouts or jaggies caused by pixels not defining the light stripe on particular scan lines are smoothed between other pixels forming the trace.

At steps 162, the trace of the light stripe is searched to determine whether a bound document has a spine region 9. The spine region 9 of a bound document is defined herein as the location for which a "spininess" measure is at a maximum. The equation $h_l+h_r-2h_c$, is used to quantitatively measure the "spininess" of a vertical scan line (i.e. a scan line along the fast scan direction), where $h_c$, is the height of the trace of the light stripe at a given vertical scan line, and $h_l$, and $h_r$ are the height of the trace a fixed number of vertical scan lines to the left and right, respectively, of the location $h_c$. This "spininess" measure is used to assess the degree to which the spine of a bound document is centered at a given vertical scan line in image ($I_1$) along the trace of the light stripe (i.e. centered at a position along the slow scan direction). If the maximum "spininess" measure falls below a preset threshold height then the trace of the light stripe is determined not to contain a book spine shape.

If a spine is detected at step 162, a parametric model of page shape near the spine region is fit to the trace of the light stripe to improve the page shape estimate in the vicinity of the spine region at step 164. This step is performed because the trace of the light stripe tends to be noisy in the spine region. The spine region of the bound document more so than any other region along the trace of the light stripe is not well identified by the raw data in image ($I_1$). To more accurately identify the spine region of a bound document in the trace of the light stripe, noisy raw profile data is replaced with a parabolic model on each side of the spine in image ($I_1$). The parabola is fit to the height of the trace of the light stripe at the spine location identified at step 162, and to the height and tangent of the smoothed profile at a fixed predetermined number of vertical scan lines away from the spine.

Referring to the Appendix which includes Sections A-D, the portions of which are incorporated as part of the present description, detail an implementation in C source code of the steps of FIG. 7. Section A of the Appendix is source code for providing general geometry support. Section B of the Appendix is source code directed at the calibration of the scanning apparatus. Section C of the Appendix is source code for estimating page shape. Section D of the Appendix is source code directed at capturing and de-warping images.

It will be understood by those skilled in the art that steps 152, 154, 156, 158, 160, 162, and 164 can be performed on an image ($I_1$) that has more than one light stripe recorded therein. In the event a plurality of light stripes are recorded in image ($I_1$), step 154 is modified to detect a starting point for each light stripe generated by projection system 22. Subsequently for each starting point identified at step 154, a trace for each light stripe of bound document 10 is determined at steps 156, 158, and 160. By using a plurality of light stripes, a three dimensional contour of the surface of bound document 10 can be determined.

Figure 8:
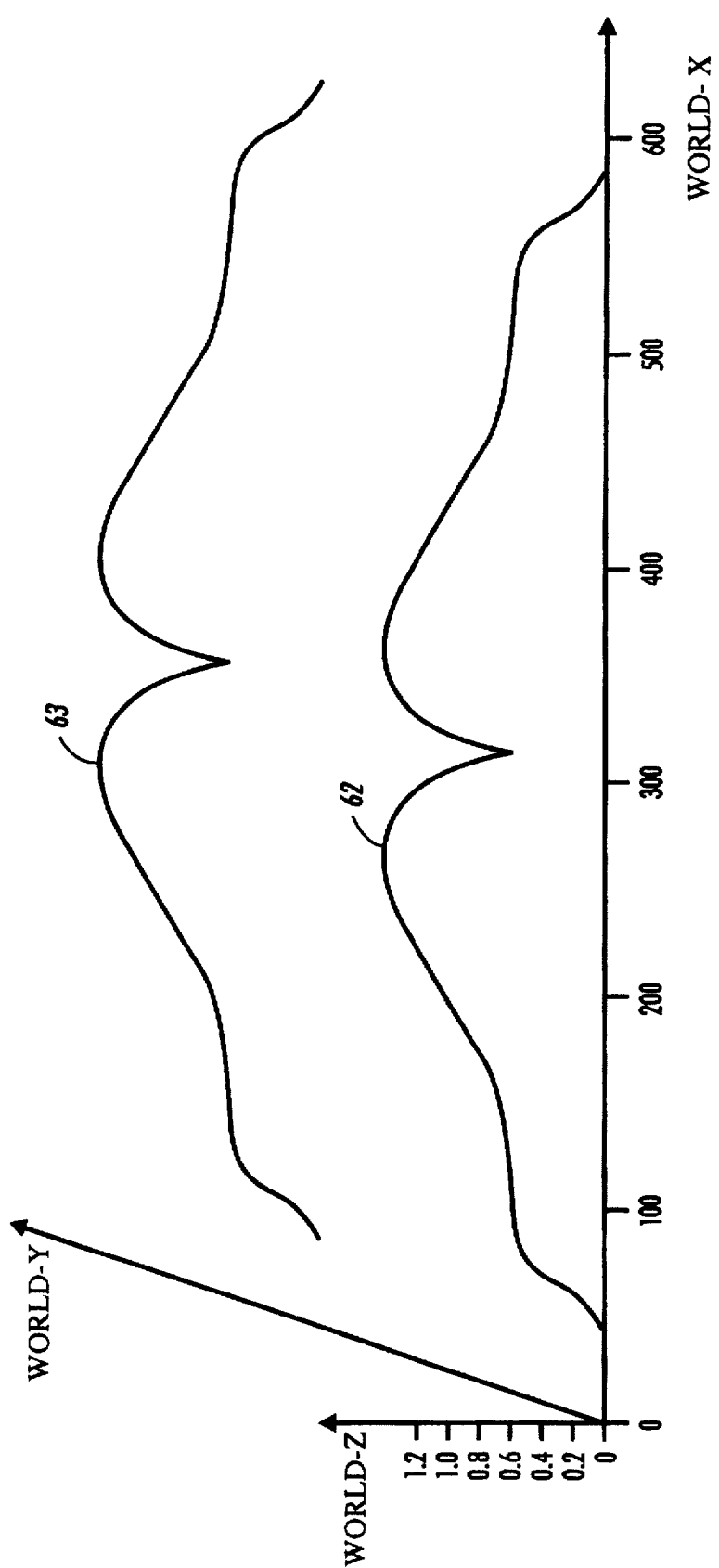
FIG. 8 is a graph of the trace of a light stripe.
Figure 9:
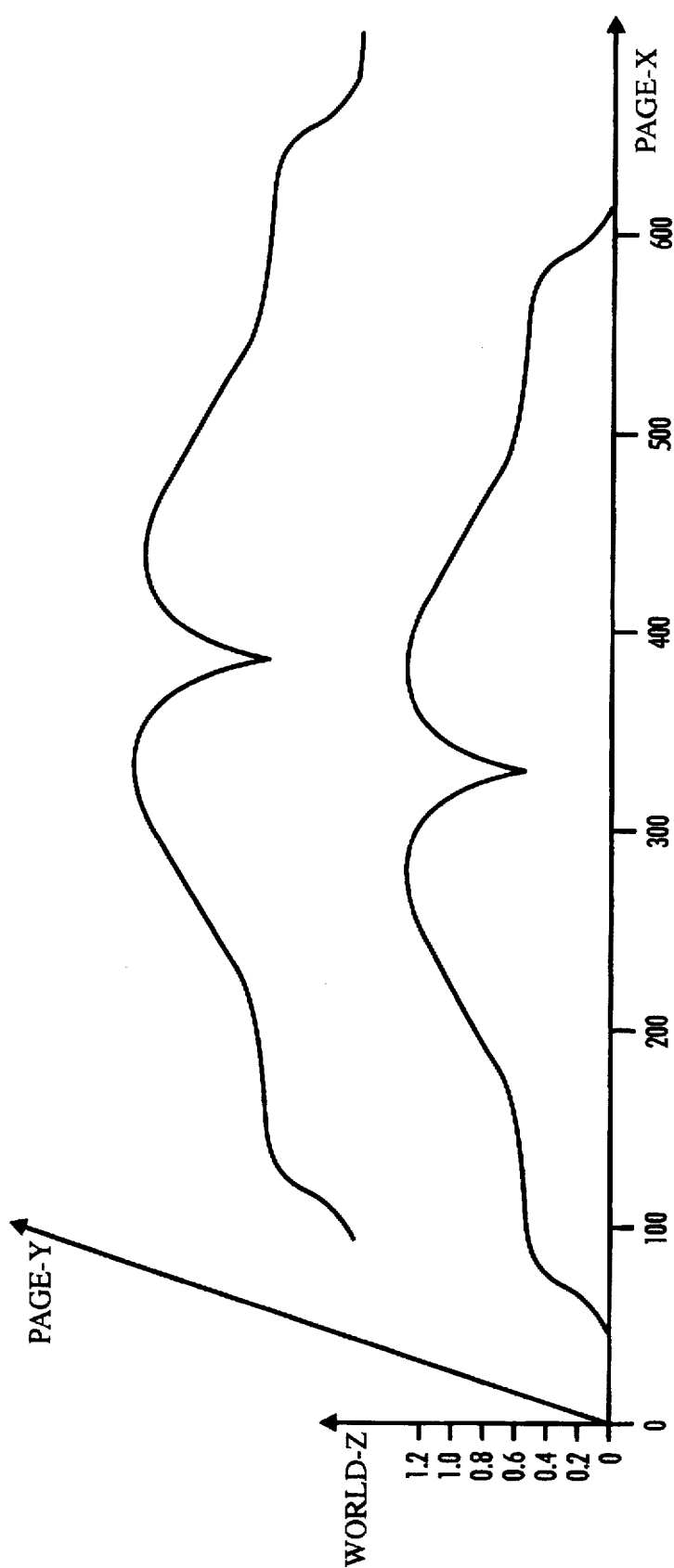
FIGS. 9, 10, and 11 illustrate lookup tables that define a page shape transform ($T_2$) that corresponds to the trace of a light stripe shown in FIG. 8.
Figure 10:
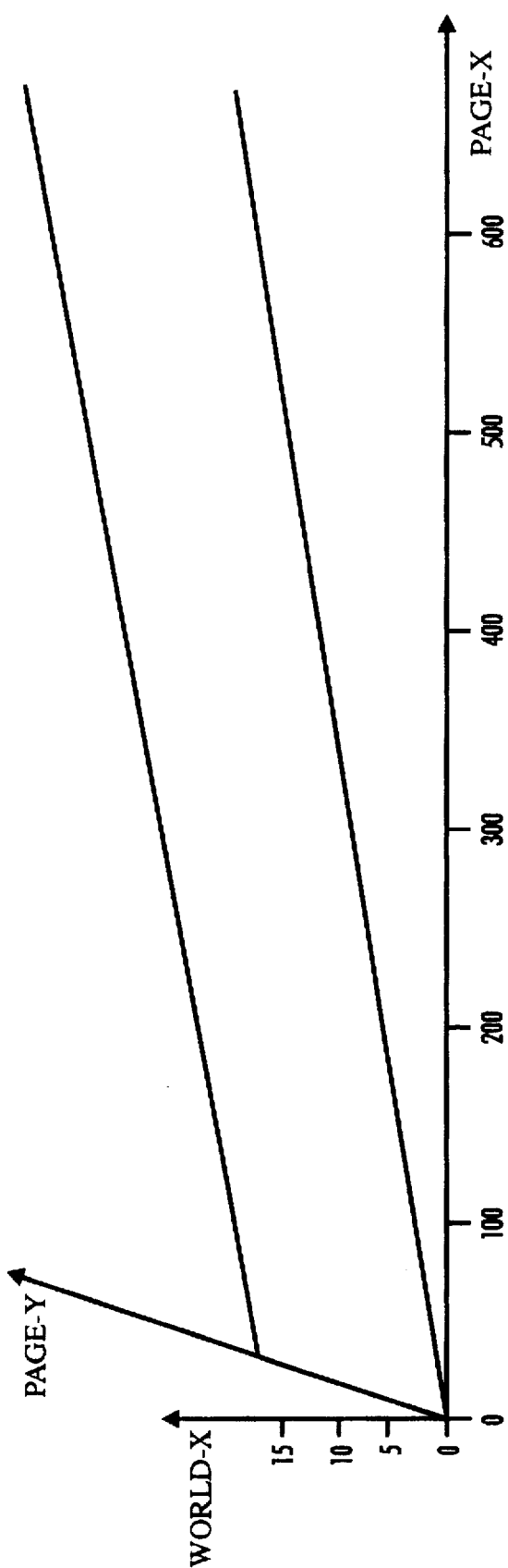
Figure 11:
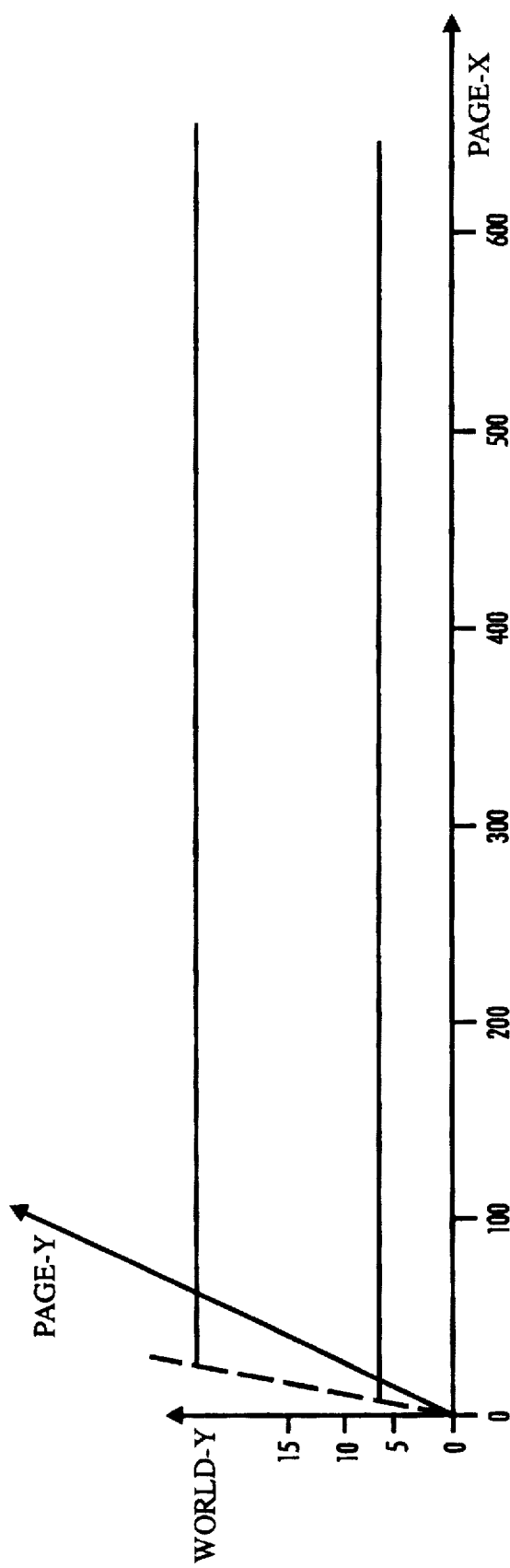

At step 166, the traces of any projected light stripes are converted to a page shape transform ($T_2$) such as a lookup table. For example, FIG. 8 is a graph of traces 62 and 63 of the light stripes 5 and 6 shown in FIG. 1. The traces 62 and 63 of light stripes 5 and 6 are defined in world coordinates (world-x, world-y, and world-z). The two light stripes 5 and 6 which are recorded as raw data in an image ($I_1$), are evaluated by page shape transform generator 40 to define traces 62 and 63 that represent the distributions formed by light stripe projection system 22 on bound document 10. The traces 62 and 63 are traced, transformed, and smoothed as set forth in steps 156, 158, and 160 in FIG. 7. In addition, if a spine region is detected in each profile 62 and 63, the regions is fit with a parametric model of a page shape as set forth at step 164. After linear interpolation and integration of the traces 62 and 63, graphs shown in FIGS. 9, 10, or 11 are generated. These graphs, which represent lookup tables, provide mappings between the world coordinate system (X,Y,Z) and the page coordinate system (page x, page y).

Figure 12:
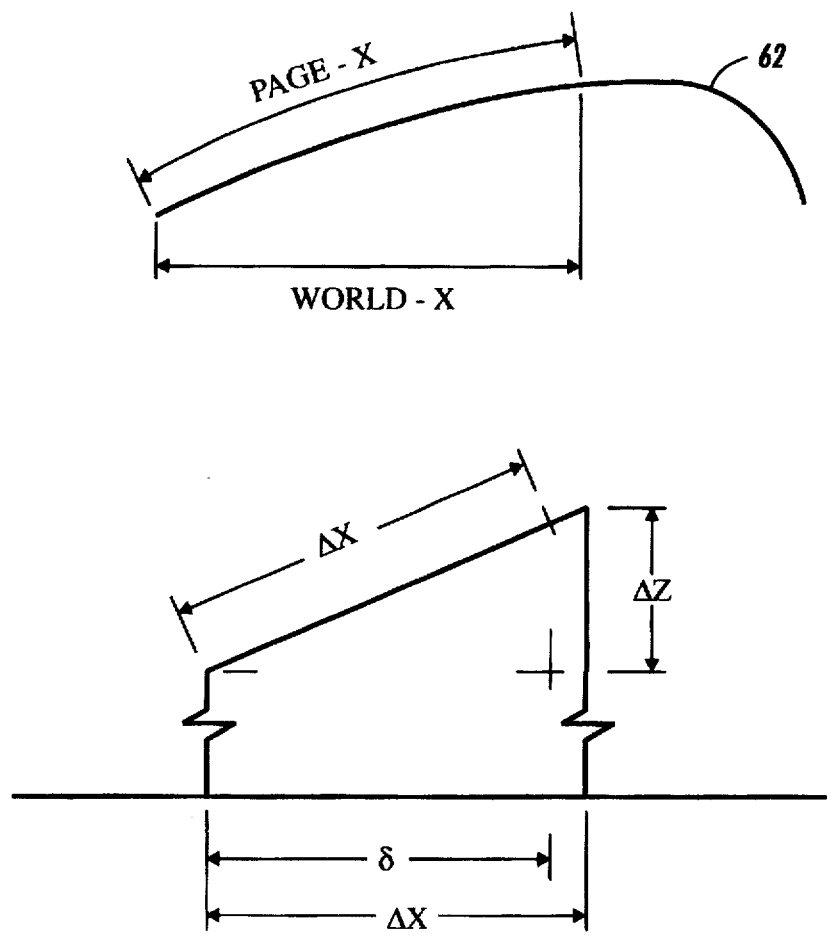
FIG. 12 illustrates a geometry that can be used to track a location in a world coordinate system while determining a location in a page coordinate system for a trace of a light stripe.

FIG. 12 illustrates a two-dimensional geometry that can be used to track a location in world coordinates while determining a location in page coordinates for light stripe trace 62. Specifically, the trace 62 defines page height and location in world coordinates in two dimensions. Using this geometry, values for page-x are determined by taking unit steps $\Delta x$ along the trace 62 while keeping track of the current location in world coordinates. In this example, world-z values versus page-x values may be determined by linear interpolation, while world-x values versus page-x values may be determined using numerical integration of steps $\delta$ in the world coordinate system. 8 is defined as:

$$\delta = \frac{\Delta x^2}{\sqrt{\Delta x^2 + \Delta z^2}},$$

where $\delta$, $\Delta x$, and $\Delta z$ are defined in FIG. 12.

Subsequent to determining the lookup tables shown in FIGS. 9-11, the lookup tables are registered to insure correct positioning of the bound document between the image and page coordinate systems. The tables are registered because the origin of each coordinate system may not be property aligned. The registration of lookup tables shown in FIGS. 9-11 can be performed by referring to the location of the spine crease detected at step 162. Registering two lookup tables in two dimensions involves registering world-x versus page-x, and world-z versus page-x lookup tables. In this example, a location $x_{cpp}$ in image coordinates that identifies the crease of a trace of a light stripe found at step 162 is mapped into a new location $X_{cw}$ in world coordinates using the camera perspective transform ($T_1$) determined at step 142. An index $x_{Opp}$ into the trace of a light stripe of the world x-origin (i.e. corresponding to world x=0) is given by the expression:

$$X_{Opp} = X_{cpp} - X_{cw} \text{ppi},$$

where "ppi" is the factor pixels-per-inch determined by the focal length of the image acquisition system 20 and the distance from the image acquisition system to the location where the light stripe projects onto platform 8. The index $x_{Opp}$ into the trace of the light stripe is transformed into an index $x_{Oxc}$, in the world-x versus page-x, and world-z versus page-x lookup tables during the numerical integration process of constructing lookup tables defining page shape transform ($T_2$) shown in FIG. 12. More generally, the index $x_{Opp}$ defines a shift that is used to correctly align the crease of the trace in the page coordinate system in the image coordinate system. Defining the shift requires that a reference point, namely the crease of the trace in the image coordinate system, is found in the page coordinate system using the perspective transform ($T_1$). However, if no crease is detected at step 162, the origin in the page coordinate system is assumed to be zero in the world coordinate system.

Figure 13:
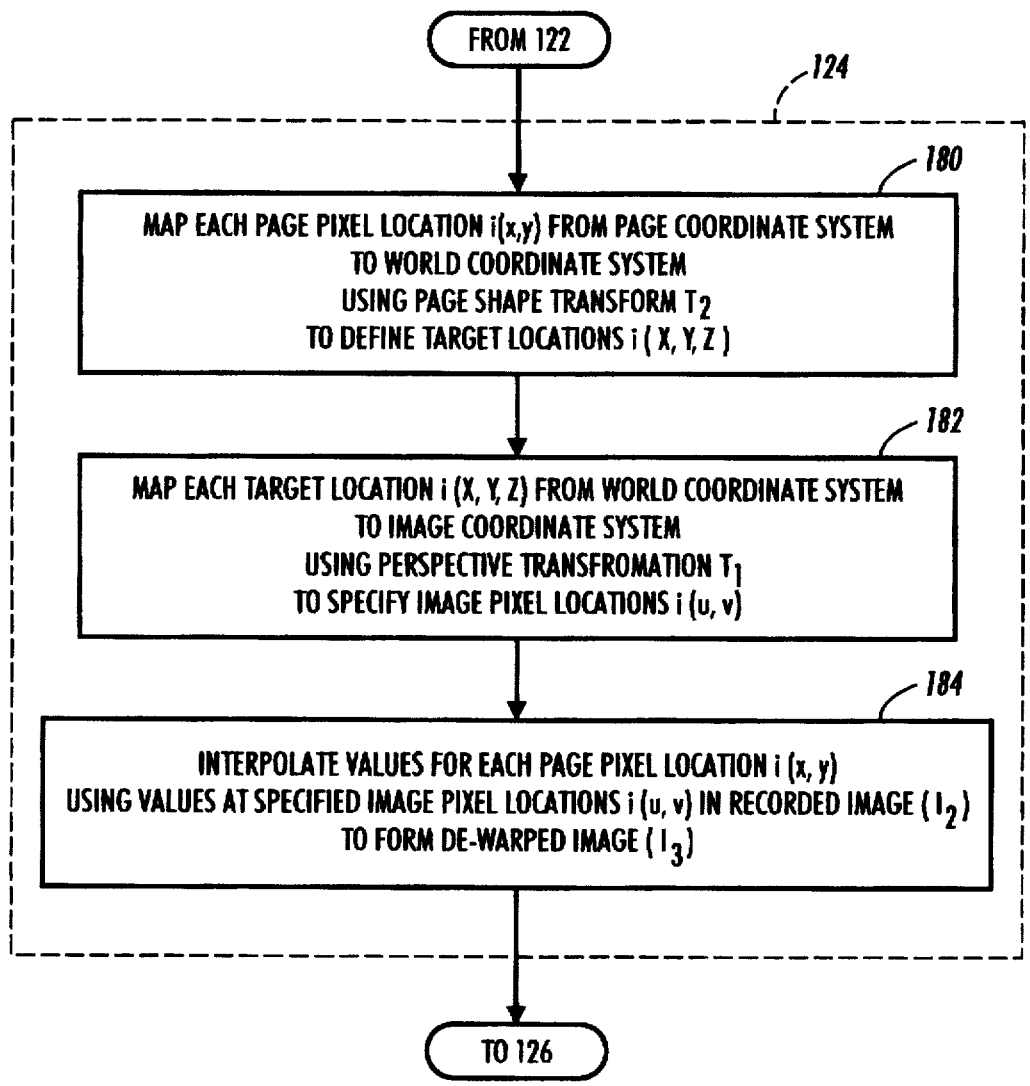
FIG. 13 is a flow chart detailing the steps for de-warping a recorded image using a perspective transform and a page shape transform.

FIG. 13 is a flow chart detailing the step 124 shown in FIG. 3. More specifically, FIG. 13 shows the steps required to reconstruct de-warped image ($I_3$) using a "polling" model. Specifically, using the "polling" model a location for each pixel in the de-warped image ($I_3$) is determined in the image ($I_2$). The de-warped image ($I_3$) is reconstructed by proceeding along an image in a vertical raster fashion, where the y-axis is the raster or fast scan direction. The color or gray density of each pixel in the de-warped image ($I_3$) is determined by locating the position of that pixel in the recorded image ($I_2$). Once a position is located in the recorded image ($I_2$), depending on the location (i.e. how well it overlaps with the pixel boundaries in the recorded image), the polling operation may require access to several image pixels in the recorded image ($I_2$) to reconstruct one output pixel in the de-warped image ($I_3$).

At step 124, de-warped image ($I_3$) is formed by correcting image ($I_2$) using perspective transform ($T_1$) and page shape transform ($T_2$). Specifically, at step 180 each page pixel location $i(x,y)$ is mapped from the page coordinate system to the world coordinate system using the page shape transform $T_2$ to define target pixel locations $i(X,Y,Z)$ in world coordinates. At step 182, these target pixel locations (X,Y,Z) in the world coordinate system are mapped to the image coordinate system using the perspective transform $T_1$ to specify image pixel locations $i(u,v)$. Transform $T_1$ is defined by the following perspective transform:

$$\begin{bmatrix} u' \\ v' \\ z' \end{bmatrix} = T_1 \begin{bmatrix} X \\ Y \\ Z \\ 1 \end{bmatrix},$$

where: u', v', and z' represent the coordinate system of the image acquisition system 20; z' is an intermediate variable that accounts for perspective depth effects; u=u'/z'; v=v'/z'; X, Y, and Z are location of a point of a bound document in world coordinates; and u, v are the location of a point of the bound document in image coordinates. At step 184, values specified at image pixel locations i(u,v) in recorded image $I_2$ are interpolated to define values for each page pixel location i(x,y) in de-warped image ($I_3$). Interpolation is well known and can be performed using alternate schemes such as bi-linear interpolation, bi-cubic interpolation, and area mapping.

It will no doubt be appreciated that there are a number of possible manners in which to implement the various aspects of present invention. Unlike most scanning systems, the present invention is a bound document scanning system with a general imaging geometry. This aspect of the present invention provides a portable book scanning system with an imageable area that is not fixed. This facilitates movement of the bound document scanning system from one physical location to another, as well as one imageable area to another. In addition, this aspect of the invention obviates the need to upend a bound document between page turns as is required when placing the bound document in contact with a flat scanning surface. Consequently, the disclosed scanning system has a maximum scanning rate which is bounded by the rate at which the pages of a bound document can be turned and recorded.

It will also be appreciated that image data 32 and page shape data 34 can be recorded in a single original image that is later divided into two images using known image processing techniques. For example, red light can be projected by the light stripe projection system 22. Any red light can be removed from a recorded image using subtractive image processing techniques. This subtractive technique defines image data and page shape data using the single original image. It will also be appreciated that the light stripe projection system is not limited to emitting red light so long as the wavelength of ambient light can be controlled, and that for the purposes of the present invention any two wavelengths that are distinguishable will do, such as green light and blue light.

It will further be appreciated that scanning system 4 can be readily modified to incorporate functions of a system that automatically turns pages of a bound document. Examples of systems for turning pages of bound documents are disclosed by Turner et al. in U.S. patent application Ser. No. 08/570,880 entitled "Bound Document Imager with Page Turner," and U.S. patent application Ser. No. 08/570,791 entitled "Bound Document Imager with Air Jet Page Turning System," both filed on Dec. 12, 1995 and assigned to the same assignee as the present invention. It will also be appreciated that scanning system 4 can be readily modified to include job level programming as described by Rourke et al. in U.S. Pat. No. 5,119,206. Job level programming can include programming that manages input scanning as well as output rendering. Programming options for scanning bound documents include input commands for specifying whether to scan one or both sides of a bound document. Programming options for rendering scanned images of a bound document include specifying whether opposing sides of a bound document are to be printed on a common print media sheet or on separate print media sheets.

Various aspects of the disclosed document scanning system may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

we claim:

1. A scanning system with a general imaging geometry for scanning pages of a bound document, comprising:

a support for positioning the pages of the bound document in an open and upward facing condition, the pages having a non-planar contour defined in a three-dimensional first coordinate system;

an image acquisition system for recording image data and page shape data in a focal plane defined in a two-dimensional second coordinate system;

a first transform generator for evaluating the page shape data to provide a first transform for defining a relationship between the first coordinate system and a two-dimensional third coordinate system, the two-dimensional third coordinate system defining an output space in which an output page of the bound document is represented in two dimensions;

a second transform generator for calibrating said image acquisition system with respect to the first coordinate system, said second transform generator providing a second transform for defining a relationship between the first coordinate system and the second coordinate system; and an image correction system for de-warping the recorded image data to form corrected image data, said image correction system de-warping the recorded image data by performing a first mapping, with the first transform, between the third coordinate system and the first coordinate system, and by performing a second mapping, with the second transform, between the first coordinate system and the second coordinate system to define a location in the second coordinate system that corresponds to a location in the third coordinate system.

2. The scanning apparatus according to claim 1, wherein said support is a platform.

3. The scanning apparatus according to claim 2, wherein said platform further comprises an imaging area of said image acquisition system.

4. The scanning apparatus according to claim 1, further comprising a light stripe projector for illuminating the bound document positioned on said support with a light stripe to form a geometrical profile map of the bound document in three dimensions.

5. The scanning apparatus according to claim 4, wherein the recorded page shape data represents the bound document with the illuminated light stripe and the recorded image data represents the bound document without the illuminated light stripe.

6. The scanning apparatus according to claim 5, wherein said light stripe projector projects a first and a second light stripe across said support.

7. The scanning apparatus according to claim 4, further comprising a calibration system positioned on said support, said calibration system including a calibration object extending out of the plane of said support and calibration marks located at defined intervals on said support.

8. The scanning apparatus according to claim 7, wherein said calibration object is retractable into said support.

9. The scanning apparatus according to claim 7, wherein the geometrical profile map defines a relationship between the height of the bound document above the support relative to the height of the bound document in the focal plane of said image acquisition system.

10. The scanning apparatus according to claim 7, wherein said image acquisition system records calibration data.

11. The scanning apparatus according to claim 1, further comprising a memory for storing the recorded image data and the recorded page shape data.

12. An apparatus according to claim 1, wherein said image acquisition system is a two-dimensional array of amorphous silicon sensors.

13. An apparatus according to claim 1, wherein said image acquisition system is a one-dimensional charge coupled device (CCD) mounted on a scanning carriage.

14. An apparatus according to claim 1, wherein said image acquisition system is positioned above and adjacent said support.

15. A method for scanning pages of a bound document having a non-planar contour when open and in an upward facing condition, comprising the steps of:

providing a support for maintaining the bound document in an open condition in a three-dimensional first coordinate system;

illuminating the bound document positioned on the support with a light stripe to form a geometrical profile map of the bound document in three dimensions;

recording image data and page shape data upon a focal plane defining a two-dimensional second coordinate system of an image acquisition system, wherein the recorded page shape data represents the bound document with the illuminated light stripe and the recorded image data represents the bound document without the illuminated light stripe;

evaluating the page shape data to define a relationship between the first coordinate system and a two-dimensional third coordinate system defining an output space in which a output page of the bound document is represented in two dimensions, said evaluating step providing a first transform to transform the recorded image data from the third coordinate system to the first coordinate system;

calibrating the image acquisition system with the first coordinate system, said calibrating step providing a second transform to transform the recorded image data from the first coordinate system to the second coordinate system; and de-warping the recorded image data to form corrected image data, said de-warping step including the steps of:

performing a first mapping, with the first transform, between a location in the third coordinate system and a location in the first coordinate system, performing a second mapping, with the second transform, between the location in the first coordinate system and a location in the second coordinate system, and performing a second mapping, with the second transform, between the location in the first coordinate system and a location in the second coordinate system, and identifying the location in the second coordinate system that corresponds to the location in the third coordinate system with the first mapping and the second mapping.

16. The method according to claim 15, further comprising the step of projecting a first light stripe on the bound document.

17. The method according to claim 16, further comprising the step of projecting a second light stripe on the support.

18. The method according to claim 15, further comprising the step of calibrating the scanning apparatus with a calibration object and calibration marks, with the calibration object having a known height and the calibration marks being located on the support at predefined intervals.

19. The method according to claim 15, wherein said recording step records the recorded image data sequentially a scan line at a time.

20. A scanning system with a general imaging geometry for scanning a bound document, comprising:

a support for positioning pages of the bound document in an open and upward facing condition; the pages of the bound document having a non-planar contour defined in a three-dimensional first coordinate system;

an image acquisition system for recording calibration data, image data, and page shape data; said image acquisition system recording the recorded calibration data, the recorded image data, and the recorded page shape data in a focal plane defining a two-dimensional second coordinate system; and an image processing system for providing corrected image data using the recorded calibration data and the recorded page shape data to de-warp the recorded image data so that distortions of the bound document in the recorded image data are minimized in the corrected image data, the image processing system, further comprising:

a first transform generator for evaluating the page shape data to provide a first transform for defining a relationship between the first coordinate system and a two-dimensional third coordinate system defining an output space in which an output page of the bound document is represented in two dimensions, said first transform generator providing a first transform to transform the recorded image data from the third coordinate system to the first coordinate system;

a second transform generator for calibrating said image acquisition system with the first coordinate system, said second transform generator providing a second transform for defining a relationship between the first coordinate system and the second coordinate system; and an image correction system for de-warping the recorded image data to form the corrected image data, said image correction system de-warping the recorded image data by performing a first mapping, with the first transform, between the third coordinate system and the first coordinate system, and by performing a second mapping, with the second transform, between the first coordinate system and the second coordinate system to define a location in the second coordinate system that corresponds to a location in the third coordinate system.

21. The scanning system according to claim 20, wherein the recorded page shape data represents the bound document with the illuminated light stripe and the recorded image data represents the bound document without the illuminated light stripe.

22. The scanning system according to claim 26, further comprising a calibration system positioned on said support, said calibration system including a calibration object extending out of the plane of said support and calibration marks located at defined intervals on said support.

* * * * *